(12) United States Patent
Mori et al.

(10) Patent No.: US 7,192,898 B2
(45) Date of Patent: *Mar. 20, 2007

(54) GLASS COMPOSITION AND GLASS SUBSTRATE

(75) Inventors: Toshiharu Mori, Settsu (JP); Hideki Kawai, Nishinomiya (JP)

(73) Assignee: Minolta Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/633,893

(22) Filed: Aug. 4, 2003

(65) Prior Publication Data

US 2004/0242398 A1    Dec. 2, 2004

(30) Foreign Application Priority Data

May 29, 2003    (JP)    .............................. 2003-153178

(51) Int. Cl.
*C03C 3/091*    (2006.01)
*C03C 3/093*    (2006.01)
*G11B 7/253*    (2006.01)

(52) U.S. Cl. ..................... 501/66; 501/67; 428/846.9

(58) Field of Classification Search ............ 501/66–69, 501/5; 428/846.9
See application file for complete search history.

(56) References Cited

U.S. PATENT DOCUMENTS

| | | | | |
|---|---|---|---|---|
| 5,972,460 | A * | 10/1999 | Tachiwana | 428/64.2 |
| 6,040,029 | A * | 3/2000 | Yamamoto et al. | 428/64.1 |
| 6,060,168 | A * | 5/2000 | Kohli | 428/428 |
| 6,303,528 | B1 * | 10/2001 | Speit et al. | 501/69 |
| 6,387,510 | B1 * | 5/2002 | Nakashima et al. | 428/426 |
| 6,440,531 | B1 * | 8/2002 | Kurachi et al. | 428/141 |
| 6,465,381 | B1 * | 10/2002 | Lautenschlager et al. | 501/67 |
| 6,818,576 | B2 * | 11/2004 | Ikenishi et al. | 501/65 |
| 2002/0010066 | A1 * | 1/2002 | Nakashima et al. | 501/69 |
| 2003/0087746 | A1 * | 5/2003 | Ritter et al. | 501/66 |
| 2005/0101469 | A1 * | 5/2005 | Peuchert et al. | 501/66 |

FOREIGN PATENT DOCUMENTS

JP    10-1329 A    1/1996

(Continued)

OTHER PUBLICATIONS

Japanese "Information Submission Statement", dated May 20, 2005, for counterpart Japanese Patent Application No. 2003-153178, along with an English-translation thereof.

(Continued)

*Primary Examiner*—Karl Group
(74) *Attorney, Agent, or Firm*—Sidley Austin LLP

(57) ABSTRACT

A glass substrate for use as the substrate of an information recording medium such as a magnetic disk, magneto-optical disk, DVD, or MD or of an optical communication device, and a glass composition for making such a glass substrate, contains the following glass ingredients: 45 to 75% by weight of $SiO_2$; 1 to 20% by weight of $Al_2O_3$; 0 to 8% by weight, zero inclusive, of $B_2O_3$; $SiO_2+Al_2O_3+B_2O_3$ accounting for 60 to 90% by weight; a total of 0 to 20% by weight, zero inclusive, of $R_2O$ compounds, where R=Li, Na, and K; and a total of 0 to 15% by weight, zero inclusive, of $TiO_2+ZrO_2+Ln_xO_y$, where $Ln_xO_y$ represents at least one compound selected from the group consisting of lanthanoid metal oxides, $Y_2O_3$, $Nb_2O_5$, and $Ta_2O_5$.

31 Claims, 1 Drawing Sheet

FOREIGN PATENT DOCUMENTS

| | | |
|---|---|---|
| JP | 11-11974 A | 1/1999 |
| JP | 11-199267 A | 7/1999 |
| JP | 2000-203872 A | 7/2000 |
| JP | 2001-019466 A | 1/2001 |
| JP | 2001-26460 A | 1/2001 |
| JP | 2001-348246 A | 12/2001 |
| JP | 2002-3241 A | 1/2002 |
| JP | 2002-167230 A | 6/2002 |
| JP | 2002-255585 A | 9/2002 |
| JP | 2002-348141 A | 12/2002 |
| JP | 2004-161597 A | 6/2004 |
| JP | 2004-277232 A | 10/2004 |
| JP | 2004-277233 A | 10/2004 |
| JP | 2004-352571 A | 12/2004 |

OTHER PUBLICATIONS

Japanese Offering of Information, dated Aug. 2, 2006, for counterpart Japanese Patent Application No. 2003-153178; Together with a copy of an English-language translation thereof.

\* cited by examiner $$C = \{(L_1 + L_2)/2\}/2$$

GLASS COMPOSITION AND GLASS SUBSTRATE

This application is based on Japanese Patent Application No. 2003-153178 filed on May 29, 2003, the contents of which are hereby incorporated by reference.

BACKGROUND OF THE INVENTION

1. Field of the Invention

The present invention relates to a glass substrate and to a glass composition for making a glass substrate. More particularly, the present invention relates to a glass substrate for use as a substrate of an information recording medium such as a magnetic disk, magneto-optical disk, DVD, or MD or of an optical communication device, and to a glass composition for making such a glass substrate.

2. Description of the Prior Art

Conventionally, magnetic disks for use in stationary devices such as desk-top computers and servers typically have substrates made of aluminum alloy, and those for use in portable devices such as notebook computers and mobile computers typically have substrates made of glass. However, aluminum alloy is prone to deformation, and is not hard enough to offer satisfactory surface smoothness on the surfaces of a substrate after polishing. Moreover, when a head makes mechanical contact with a magnetic disk, the magnetic film is liable to exfoliate from the substrate. For these reasons, substrates made of glass, which offer satisfactory surface smoothness and high mechanical strength, are expected to be increasingly used in the future not only in portable devices but also in stationary devices and other home-use information devices.

One known type of glass substrate is those made of chemically strengthened glass, in which the alkali elements present near the surface of the substrate are replaced with other alkali elements in order to produce compression strain and thereby increase mechanical strength. However, chemically strengthened glass requires a complicated ion exchange process, and does not permit reprocessing once ion exchange is complete. This makes it difficult to achieve a high yield rate. Moreover, to permit ion exchange to take place in the glass substrate, alkali ions need to be left easily movable therein. Thus, the alkali ions that are present near the surface of the substrate may move to the surface and exude therefrom during the heating step when the magnetic film is formed, or erode the magnetic film, or degrade the bond strength of the magnetic film.

Another type of glass substrate, known as common glass substrates that are not treated by chemical strengthening, is those made of soda lime. However, soda lime is not mechanically strong or chemically durable enough to be suitable as a material for substrates for information recording. Glass materials used in substrates of liquid crystal panels or the like are so prepared as to have a low or no alkali content so that they have low linear thermal expansion coefficients. This helps maintain thermal stability at high temperatures. However, as a result, these materials have linear thermal expansion coefficients that greatly differ from that of, for example, stainless steel (SUS), of which clamps and spindle motor components are made. This often causes trouble when a recording medium is mounted in a recording device or when information is recorded. Moreover, these materials are not mechanically strong enough to be suitable as a material for substrates for information recording.

Glass substrates are used also as substrates in optical communication devices such as optical filters and optical switches. These devices, however, are occasionally degraded by elution of the alkali content from their glass substrate. Moreover, the higher the density of the film formed on a glass substrate, the more the wavelength shifts ascribable to variations in temperature and humidity can be reduced. There is a limit, however, to the density of a film that can be formed by vapor deposition, which is the method widely used conventionally.

Furthermore, in a case where a glass substrate is used for information recording, when an information recording film is formed on the glass substrate, the pressure, heat, or impact applied to its surface may produce a crack in the glass substrate, leading to a lower product yield.

SUMMARY OF THE INVENTION

An object of the present invention is to provide a glass substrate, and a glass composition for making it, that has high mechanical strength without being treated by strengthening, that has low alkali elution, that has a linear thermal expansion coefficient close to that of motor components, that has a high fracture toughness, that has a predetermined surface hardness, and that excels in workability and productivity.

To achieve the above object, according to the present invention, a glass substrate, and a glass composition for making it, contains the following glass ingredients:
- 45 to 75% by weight of $SiO_2$;
- 1 to 20% by weight of $Al_2O_3$;
- 0 to 8% by weight, zero inclusive, of $B_2O_3$;
- $SiO_2+Al_2O_3+B_2O_3$ accounting for 60 to 90% by weight;
- a total of 0 to 20% by weight, zero inclusive, of $R_2O$ compounds, where R=Li, Na, and K; and
- a total of 0 to 15% by weight, zero inclusive, of $TiO_2+ZrO_2+Ln_xO_y$, where $Ln_xO_y$ represents at least one compound selected from the group consisting of lanthanoid metal oxides, $Y_2O_3$, $Nb_2O_5$, and $Ta_2O_5$.

It is to be noted that, in the following descriptions, "%" denotes "percent by weight" unless otherwise stated.

The glass substrate described above has high rigidity without being subjected to strengthening, has an adequate surface hardness to prevent scratches on its surface but permit easy surface treatment such as polishing, and has low alkali elution. Moreover, as compared with conventional glass substrates, the glass substrate described above has a higher linear thermal expansion coefficient, which is thus closer to that of hard disk drive components. This makes trouble unlikely when a recording medium is mounted in a recording device or when information is recorded. Moreover, the glass substrate described above has a high fracture toughness. This prevents breakage of a substrate as when a substrate for information recording is fabricated. Furthermore, the glass substrate described above has $SiO_2$ elution and a fracture toughness in prescribed ranges. This helps obtain a high-quality substrate surface and achieve enhanced productivity In the present invention, the fracture toughness Kc was determined using a Vickers hardness tester and according to the formula noted below on the basis of the pressure mark produced with a Vickers indenter under the following conditions: with a load of 500 g, and with loading duration of 15 seconds.

$$Kc=0.018(E/Hv)^{1/2}(P/C^{3/2})=0.026E^{1/2}P^{1/2}a/C^{3/2}$$

where Kc represents the fracture toughness ($Pa \cdot m^{1/2}$), E represents the elastic modulus (Pa), Hv represents the Vickers hardness (Pa), P represents the pressing load (N), C represents half the average of the lengths of cracks (m), and "a" represents half the average of the lengths of the diagonals of the pressure mark (m).

The $SiO_2$ elution A and alkali elution B were determined by first polishing the surface of the glass substrate with cerium oxide so as to obtain a smooth surface having an Ra value of 2 nm or lower, then cleaning the surface, then immersing the glass substrate in 50 ml of reverse osmosis membrane water at 80° C. for 24 hours, and then analyzing the elution liquid with an ICP emission spectrochemical analyzer. Thus, the alkali elution here is the total elution of Li, Na, and K. As glass samples, those having substantially the same surface area as a 2.5-inch disk were used. The specific elastic modulus ($E/\rho$) equals the Young's modulus E divided by the specific gravity $\rho$. The Young's modulus E was measured by the method for testing dynamic modulus of elasticity included in the methods for testing elasticity of fine ceramics defined in JIS (Japanese Industrial Standards) R 1602, and the specific gravity $\rho$ was measured in distilled water at 25° C. by a method based on Archimedes' principle. The Vickers hardness Hv was measured using a Vickers hardness tester under the following conditions: with a load of 100 g, and with loading duration of 15 seconds. The linear thermal expansion coefficient $\alpha$ was measured using a differential dilatometer under the following conditions: with a load of 5 g, within a temperature range of from 25 to 100° C., and at a temperature increase rate of 5° C./min.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
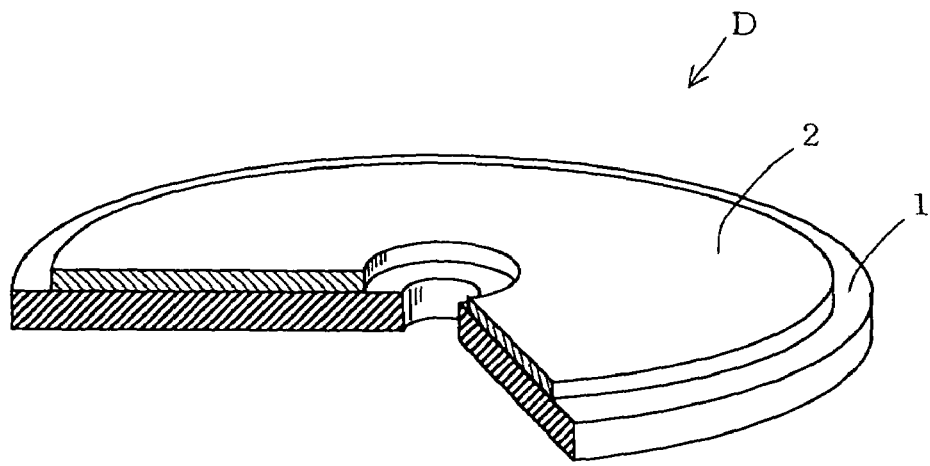
FIG. 1 is a perspective view showing an example of an information recording medium employing a glass substrate according to the invention.
Figure 2:
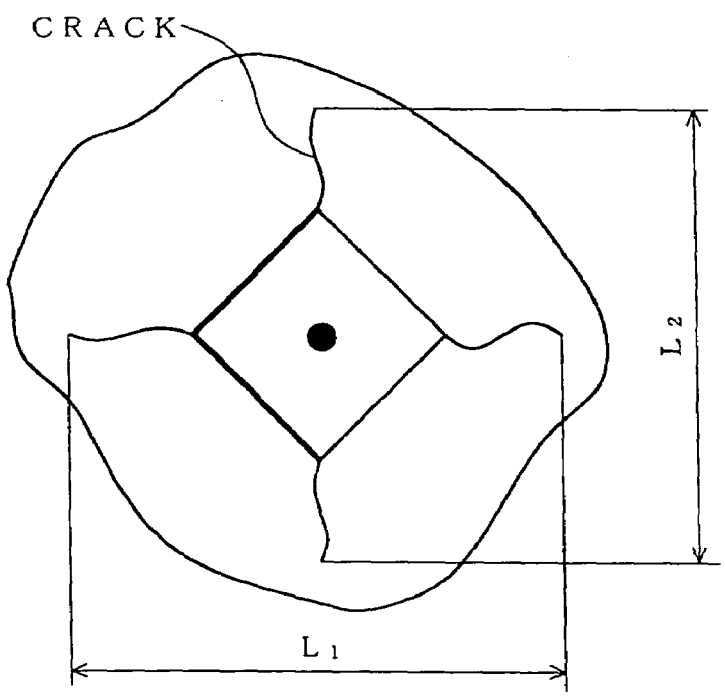
FIG. 2 is a diagram schematically showing a pressure mark and cracks produced when a pressure is applied to the surface of a glass substrate with a Vickers indenter.

The inventors of the present invention have made an intensive study in search of a way of increasing the rigidity of a glass substrate without treating it by strengthening, increasing the linear thermal expansion coefficient thereof than ever while reducing the alkali elution and $SiO_2$ elution therefrom, enhancing the chemical durability thereof, and increasing the fracture toughness thereof. The study has led the inventors to find out that it is possible to obtain predetermined rigidity by using $SiO_2$ as the matrix ingredient of glass and adding thereto predetermined amounts of $Al_2O_3$ and $B_2O_3$ to form the skeleton of glass, that it is possible to obtain a higher linear thermal expansion coefficient while achieving lower alkali elution by controlling within a predetermined range the total content of particular alkali metal oxides, and that it is possible to obtain a higher specific elastic modulus and a higher fracture toughness by controlling within a predetermined range the total content of $TiO_2+ZrO_2+Ln_xO_y$. These findings have led to the present invention.

Hereinafter, the grounds for setting limitations on the ingredients of a glass composition according to the present invention will be explained. First of all, $SiO_2$ is an ingredient that forms the matrix of glass. With a $SiO_2$ content less than 45%, the glass has an unstable structure. This not only degrades the chemical durability of the glass, but also degrades the melt viscosity properties thereof, making the glass difficult to mold. On the other hand, with a $SiO_2$ content higher than 75%, the glass shows low fusibility. This lowers productivity and makes it impossible to obtain sufficient rigidity. Hence, a preferred range of the $SiO_2$ content is from 45 to 75%. A further preferred range is from 50 to 72%.

$Al_2O_3$ gets into the matrix of glass, and serves to stabilize the structure of the glass and enhance the chemical durability thereof. With an $Al_2O_3$ content lower than 1%, the glass structure is not stabilized sufficiently. On the other hand, with an $Al_2O_3$ content higher than 20%, the glass shows low fusibility, lowering productivity. Hence, a preferred range of the $Al_2O_3$ content is from 1 to 20%. A further preferred range is from 3 to 16%.

$B_2O_3$ improves the fusibility of glass and thereby enhances productivity. In addition, it gets into the matrix of the glass, and serves to stabilize the structure of the glass and enhance the chemical durability thereof. With a $B_2O_3$ content higher than 8%, the glass shows poor melt viscosity properties. This makes the glass difficult to mold, and makes the glass unstable. Hence, a preferred range of the $B_2O_3$ content is 8% or lower (zero inclusive). A further preferred upper limit is 6%, and a preferred lower limit is 1.2%.

If the total content of these three glass ingredients, which are the skeletal ingredients of glass, is less than 60%, the glass has a brittle structure. On the other hand, if their total content is higher than 90%, the glass shows low fusibility, lowering productivity. Hence, a preferred total content of those glass ingredients is from 60 to 90%. A further preferred range is from 68 to 88%.

Alkali metal oxides $R_2O$ (R=Li, Na, and K) improve the fusibility of glass, and increase the linear thermal expansion coefficient thereof. With a total alkali metal oxide content higher than 20%, excess amounts of alkali metal oxides are dispersed throughout the skeleton of the glass, increasing alkali elution and greatly degrading chemical durability. Hence, a preferred range of the total alkali metal oxide content is 20% or lower. A further preferred range is 8 to 18%. Moreover, to obtain a so-called mixed alkali effect, which helps reduce alkali elution, it is preferable that the lower limit of the content of each alkali metal oxide be 0.1%. On the other hand, for satisfactory chemical durability and melt stability, it is preferable that the upper limit of the $Li_2O$ and $Na_2O$ contents be 15% each and that of the $K_2O$ content be 10%.

$TiO_2$ strengthens the structure of glass, enhances the rigidity thereof, and improves the fusibility thereof. $ZrO_2$ strengthens the structure of glass, enhances the rigidity thereof, and enhances the chemical durability thereof. $Ln_xO_y$ strengthens the structure of glass, and enhances the rigidity and toughness thereof. Here, $Ln_xO_y$ represents at least one compound selected from the group consisting of lanthanoid metal oxides, $Y_2O_3$, $Nb_2O_5$, and $Ta_2O_5$. Lanthanoid metal oxides include different types of compounds of composition $Ln_2O_3$, LnO, and the like, and examples of Ln include La, Ce, Er, Pr, Nd, Pm, Sm Eu, Gd, Tb, Dy, Ho, Tm, Yb, and Lu. With a total content of $TiO_2+ZrO_2+Ln_xO_y$ higher than 15%, the glass may be unstable, with greatly reduced toughness and a higher tendency to devitrification, leading to extremely low productivity. Hence, a preferred range of the total content of these glass ingredients is 15% or lower. A further preferred range of their total content is from 1 to 14%.

A glass composition according to the present invention may further contain, as necessary, prescribed amounts of one or two or more divalent metal oxides R'O (R'=Mg, Ca, Sr, Ba, and Zn). The reasons for using these ingredients and their preferred contents are as follows.

MgO increases the rigidity of glass and improves the fusibility thereof. With a MgO content higher than 10%, the glass may have an unstable structure, lowering the melt productivity and chemical durability of the glass. Hence, a preferred range of the MgO content is from 0 to 10%. A further preferred upper limit is 8%.

CaO increases the linear thermal expansion coefficient and rigidity of glass, and improves the fusibility thereof. With a CaO content higher than 10%, the glass may have an unstable structure, lowering the melt productivity and chemical durability of the glass. Hence, a preferred range of the MgO content is from 0 to 10%. A further preferred upper limit is 8%.

SrO increases the linear thermal expansion coefficient of glass, stabilizes the structure thereof, and improves the fusibility thereof. With a SrO content higher than 8%, the glass may have an unstable structure. Hence, a preferred range of the SrO content is from 0 to 8%. A further preferred upper limit is 6%.

BaO exerts the same effects as SrO. With a BaO content higher than 8%, the glass may have an unstable structure. Hence, a preferred range of the BaO content is from 0 to 8%. A further preferred upper limit is 6%.

ZnO increases the chemical durability and rigidity of glass, and improves the fusibility thereof. With a ZnO content higher than 6%, the glass may have an unstable structure, lowering the melt productivity and chemical durability of the glass. Hence, a preferred range of the ZnO content is from 0 to 6%. A further preferred upper limit is 5%.

A preferred range of the total content of these divalent metal oxides R'O (R'=Mg, Ca, Sr, Ba, and Zn) is 12% or lower. With a total content of 12% or higher, the glass may have an unstable structure, lowering the melt productivity and chemical durability of the glass. A further preferred upper limit of the total amount of R'O compounds is 10%.

To a glass composition according to the invention, 2% or less of a clarifier such as $Sb_2O_3$ may also be added. As required, any other conventionally known glass ingredient or additive may be added so long as it does not spoil the effects achieved by the present invention.

Next, a glass substrate according to the present invention will be described. The main feature of a glass substrate according to the invention is that it is formed of a glass composition as described above. A glass substrate according to the invention may be produced by any conventionally known fabrication process, for example in the following manner. Raw materials of glass ingredients, i.e., oxides, carbonates, nitrates, hydroxides, and the like corresponding to the individual ingredients, are, in the desired proportions and in the form of powder, fully mixed to obtain a blending of the raw materials. This blending is then put, for example, in a platinum crucible placed inside an electric furnace heated to 1,300 to 1,550° C. where the blending is first melted and clarified and then stirred and homogenized. The molten glass is then poured into a preheated mold, and is cooled slowly so as to be formed into a glass block. Next, the glass block is heated again to close to its glass transition point and is then cooled slowly so as to be straightened. The glass block thus obtained is then sliced into a disk, and is cut out using a core drill so as to have concentric outer and inner edges. Alternatively, the molten glass is formed into a disk by press molding. The disk-shaped glass material thus obtained is then formed into a glass substrate by subjecting the two flat surfaces of the glass material to coarse and fine polishing and then to cleaning using at least one of a water liquid, an acidic liquid, or an alkaline liquid.

In a case where a glass substrate according to the invention is used, for example, as a substrate of an information recording medium, to minimize the floating distance of the head and the film thickness of the recording medium, it is preferable that the glass substrate have, after the polishing step, a surface roughness Ra of 1 nm or lower and, after the cleaning step, a surface roughness Ra' equal to or lower than 1.5 times the surface roughness Ra. With a glass substrate containing alkali ingredients in high proportions and treated by strengthening, it is possible to obtain a surface roughness Ra of 1 nm or lower by polishing, but, when the surface of the substrate is cleaned with water, an acid, or an alkali in the following cleaning step, owing to its low chemical durability, its surface is violently eroded, resulting in a high surface roughness Ra' after the cleaning step. On the other hand, with a glass substrate that is not treated by strengthening, its composition is uniform between at the surface and in the interior, and therefore, in general, the surface roughness Ra' of the substrate does not change so much during the cleaning step. Accordingly, by optimizing the glass ingredients, it is possible to control the surface roughness Ra' after the cleaning step within 1.5 times the surface roughness Ra after the polishing step.

It is preferable that a glass substrate according to the invention have properties that fulfill the following conditions. First, it is preferable that a glass substrate according to the invention have a fracture toughness Kc of 0.90 or higher. With a fracture toughness Kc lower than 0.90, when the glass substrate is used in an information recording medium, a crack may develop in the glass substrate when pressure or the like is applied thereto in the step of forming a recording film such as a magnetic film on the surface thereof. Moreover, with a fracture toughness Kc lower than 0.90, the substrate is prone to damage when it is machined, leading to a low machining yield. A further preferred lower limit of the fracture toughness Kc is 0.92.

It is preferable that a glass substrate according to the invention have $SiO_2$ elution A in the range of from 10 to 450 ppb per 2.5-inch disk. Since $SiO_2$ is the main ingredient of the glass skeleton, the $SiO_2$ elution A serves as an indicator of the watertightness of the glass substrate, i.e., its stability against water. With $SiO_2$ elution A lower than 10 ppb, the glass substrate cannot be machined at a sufficiently high machining rate (the amount removed by machining per unit time), leading to lower productivity. On the other hand, with $SiO_2$ elution A higher than 450 ppb, the glass substrate is not sufficiently watertight. This lowers production stability in the polishing and clearing steps in the fabrication process, and makes the glass substrate susceptible to the influence of moisture present in the air, leading to lower storage stability. A further preferred range of the $SiO_2$ elution A is from 11 to 400 ppb per 2.5-inch disk.

To obtain a high-quality substrate surface, and to achieve high productivity, it is recommended to control the ratio of the $SiO_2$ elution A to the fracture toughness Kc within the range of from 3 to 500. If the ratio of the $SiO_2$ elution A to the fracture toughness Kc is greater than 500, the glass substrate may exhibit low chemical durability, and may be prone to chip or crack, leading to a low machining yield. On the other hand, if the ratio of the $SiO_2$ elution A to the fracture toughness Kc is lower than 3, the glass substrate exhibits better chemical durability, but may exhibit lower workability, leading to lower productivity. A further preferred range of the ratio of the $SiO_2$ elution A to the fracture toughness Kc is from 5 to 450.

It is preferable that a glass substrate according to the invention have alkali elution B of 350 ppb or lower per 2.5-inch disk. With alkali elution B higher than 350 ppb, when the glass substrate is used in an information recording medium, the recording film such as a magnetic film that is formed on the surface of the glass substrate is degraded by elution of the alkali ingredients from the substrate. Further preferable alkali elution B is 320 ppb or lower.

It is preferable that a glass substrate according to the invention have a specific elastic modulus E/ρ of 30 or higher. With a glass substrate that is not treated by strengthening, its mechanical strength depends on its rigidity. Thus, with a specific elastic modulus lower than 30, the substrate has insufficient mechanical strength so that, when it receives impact while being mounted in a hard disk drive, it is prone to breakage at where it is fastened to a hard disk drive member. A further preferred specific elastic modulus E/ρ is 32 or higher.

It is preferable that a glass substrate according to the invention have a Vickers hardness Hv in the range of from 500 to 700. With a Vickers hardness lower than 500, the substrate is prone to breakage resulting from impact and to damage in the fabrication process. On the other hand, a Vickers hardness higher than 700 lowers the rate at which the glass substrate can be polished in the polishing step, makes it difficult to obtain a surface with the desired flatness, and makes it difficult to adjust the surface shape of the substrate by tape texture polishing, or correct surface defects by scrub washing, or perform other treatment after the polishing step. The Vickers hardness of the substrate can be controlled within that range, for example, by adjusting, so long as the desired main properties are not degraded, the proportions of the ingredients in such a way as to increase the ion fill factor. A further preferred lower limit of the Vickers hardness Hv is 520, and a further preferred upper limit thereof is 680.

It is preferable that a glass substrate according to the invention have a linear thermal expansion coefficient a in the range of from $40 \times 10^{-7}$ to $90 \times 10^{-7}$/° C. With a linear thermal expansion coefficient α outside this range, when an information recording medium is produced using the glass substrate, its linear thermal expansion coefficient differs so greatly from that of the material of the drive unit in which the information recording medium is mounted as to produce stress around where the information recording medium is mounted. As a result, the substrate may break or deform, causing deviations in recording positions and thus making reading and writing of data impossible. A further preferred lower limit of the linear thermal expansion coefficient is $62 \times 10^{-7}$/° C., and a further preferred higher limit thereof is $88 \times 10^{-7}$/° C.

It is preferable that a glass substrate according to the invention, when melted and kept at 1,500° C. for 24 hours, exhibit a weight reduction factor lower than 8.0%. A weight reduction factor of 8.0% or higher leads to unstable properties and lower productivity.

In a glass substrate according to the invention, it is preferable that the glass transition temperature Tg be 600° C. or lower, that, for satisfactory productivity in the melt molding step and out of other considerations, the liquid phase temperature $T_L$ be 1,300° C. or lower, and that the temperature $T_{log\ \eta=2}$ at which the glass substrate has a melt viscosity of log η=2 be 1,550° C. or lower. The glass transition temperature, the liquid phase temperature, and $T_{log\ \eta=2}$ can be controlled within these ranges in the following manner. For example, the glass transition temperature is controlled by adjusting, so long as the desired main properties are not degraded, the total content and proportions of the skeletal ingredients $SiO_2$, $B_2O_3$, and $Al_2O_3$ and the content of alkali metal oxides, i.e., the ingredients that greatly reduce the glass transition temperature. The liquid phase temperature can be controlled by adjusting the total content and proportions of ingredients of which the addition in excess amounts makes the glass unstable. $T_{log\ \eta=2}$ can be controlled by adjusting, so long as the desired main properties are not degraded, the proportions in which $SiO_2$, i.e., the main ingredient that increases the viscosity, and other ingredients that improve the viscosity are added.

A glass substrate according to the invention can be used to produce disks of any diameter, for example 3.5-inch, 2.5-inch, 1.8-inch, and any smaller-diameter disks, with any thickness, for example 2 mm thick, 1 mm thick, 0.63 mm thick, and any slimmer disks.

Next, an information recording medium employing a glass substrate according to the present invention will be described. When employed as a substrate of an information recording medium, a glass substrate according to the invention contributes to durability and high recording density. Now, such an information recording medium will be described with reference to the drawing.

FIG. 1 is a perspective view of a magnetic disk. This magnetic disk D is composed of a circular glass substrate 1 and a magnetic film 2 formed directly on a surface thereof. The magnetic film 2 may be formed by any conventionally known method. For example, it is formed by spin-coating the substrate with a thermosetting resin having magnetic particles dispersed therein, or by sputtering, or by electroless plating. Spin-coating provides a film thickness of about 0.3 to 1.2 μm, sputtering provides a film thickness of about 0.04 to 0.08 μm, and electroless plating provides a film thickness of about 0.05 to 0.1 μm. To minimize the film thickness and maximize the density, it is preferable to form the magnetic film 2 by sputtering or electroless plating.

The magnetic film may be formed out of any conventionally known magnetic material, of which a preferred example is a Co-based alloy that contains Co, which exhibits high crystal anisotropy, as its main ingredient so as to have high coercivity and that has Ni and Cr added thereto to adjust remanent magnetic flux density. Specifically, examples of such alloys containing Co as their main ingredient include CoPt, CoCr, CoNi, CoNiCr, CoCrTa, CoPtCr, CoNiPt, CoNiCrPt, CoNiCrTa, CoCrPtTa, CoCrPtB, and CoCrPt-SiO. The magnetic film may be divided into a plurality of layers with one or more non-magnetic films (for example, Cr, CrMo, or CrV) laid in between so as to form a multilayer structure (for example, CoPtCr/CrMo/CoPtCr, or CoCrPtTa/CrMo/CoCrPtTa) with a view to reducing noise. Instead of the magnetic materials mentioned above, it is also possible to use a magnetic material of a granular type having magnetic particles of Fe, Co, FeCo, CoNiPt, or the like dispersed in a non-magnetic film of a ferrite-based material, an iron/rare earth-based material, $SiO_2$, BN, or the like. The magnetic film may be for either surface recording or vertical recording.

To ensure smooth sliding of a magnetic head, the magnetic film may be coated with a thin layer of lubricant on the surface. An example of the lubricant is perfluoro polyether (PFPE), a liquid lubricant, diluted with a CFC-based solvent.

As required, a primer or protective layer may additionally be formed. In a magnetic disk, the material of the primer layer is selected according to the magnetic film. The primer layer is formed out of, for example, one or more selected from non-magnetic metals such as Cr, Mo, Ta, Ti, W, V, B, Al, and Ni. With a magnetic film containing Co as its main ingredient, Cr used singly or a Cr alloy is preferred for better magnetic properties and out of other considerations. The primer layer may be composed of a single layer, or may be composed of a plurality of layers of identical or different types laid over one another to form a multilayer primer layer such as Cr/Cr, Cr/CrMo, Cr/CrV, NiAl/Cr, NiAl/CrMo, or NiAl/CrV.

The protective layer for preventing wear and corrosion of the magnetic film may be a layer of Cr, Cr alloy, carbon, hydrogenated carbon, zirconia, silica, or the like. Such a protective layer can be formed in continuous steps with the primer layer, the magnetic film, and the like using an in-line-type sputtering machine. The protective layer may be composed of a single layer, or may be composed of a plurality of layers of identical or different types laid over one another to form a multilayer protective layer. It is also possible to form, on top of or instead of the protective layer described above, another protective layer. For example, instead of the protective layer described above, a layer of silicon oxide ($SiO_2$) may be formed by applying, on top of a Cr layer, and then burning fine particles of colloidal silica dispersed in tetraalkoxysilane diluted with an alcohol-based solvent.

A magnetic disk has been described above as an example of an information recording medium according to the invention. It is to be understood, however, that a glass substrate according to the invention applies not only to this type of information recording medium but also to magneto-optical disks, optical disks, and the like.

Moreover, a glass substrate according to the invention is suitably used also in optical communication devices. A glass substrate according to the invention has alkali elution as low as 350 ppb or lower per 2.5-inch disk, and therefore the film formed thereon is not degraded by elution of the alkali ingredients therefrom. Moreover, compared with conventional glass substrates, a glass substrate according to the invention has a linear thermal expansion coefficient as high as from $40 \times 10^{-7}/°C$. to $90 \times 10^{-7}/°C$., and therefore, when the glass substrate heated in the vapor deposition step is cooled, it shrinks more, compressing the film formed on the surface thereof more and thereby increasing the density of the film. This helps alleviate the wavelength shifts resulting from variations in temperature and humidity.

Now, an optical filter for dense wavelength division multiplexing (DWDM) will be described as an example of an optical communication device employing a glass substrate according to the present invention. An optical filter employing a dielectric multilayer film has high-refractive-index layers and low-refractive-index layers laid over one another. These layers are formed by any conventionally known method, examples of which include vacuum deposition, sputtering, ion plating, and ion beam assisted deposition. Among these methods, vacuum deposition is preferred for the high productivity it provides. Vapor deposition is a method of forming a thin film by heating a material to be evaporated in a vacuum and making the resulting vapor condense on and adhere to a base substrate. The material to be evaporated is heated by one of various methods such as by resistance heating, in an externally heated crucible, with an electron beam, with microwaves, or with a laser beam. Specifically, the material is evaporated in a vacuum of about $1 \times 10^{-3}$ to $5 \times 10^{-3}$ Pa. While the material is being evaporated, the amount of oxygen introduced is adjusted by controlling a solenoid valve so that the degree of vacuum is kept constant. The thickness of each film so formed is monitored so that evaporation is stopped when the desired film thickness is obtained.

There is no particular restriction on the thickness of individual films, but each film is routinely given a thickness equal to one-fourth of the wavelength, generally up to 1 μm. The total number of films generally exceeds 100. The films are formed out of, for example, a dielectric, semiconductor, or metal, among which a dielectric is particularly preferred.

An optical filter for DWDM has been described above as an example of an optical communication device employing a glass substrate according to the invention. It is to be understood, however, that a glass substrate according to the invention applies not only to this type of optical communication device but also to other types of optical communication device such as optical switches and multiplexing/branching devices.

EXAMPLES

Practical Examples 1 to 40 and Comparative Examples 1 to 5

For each of different glass compositions, which each correspond to one of Practical Examples 1 to 40 and Comparative Examples 1 to 5, prescribed amounts of glass ingredients in the form of powder were weighed and put in a platinum crucible, were mixed, and then were melted at 1,550° C. in an electric furnace. When the ingredients were melted sufficiently, stirring blades were put into the molten glass to stir it for about one hour. Thereafter, the stirring blades were taken out, then the molten glass was allowed to stand for 30 minutes, and then it was poured into a mold so as to be formed into a glass block. The glass block was then heated again to close to its glass transition point, and was then cooled slowly so as to be straightened. The glass block thus obtained was then sliced into a disk about 1.5 mm thick and 2.5 inches across, and was cut out using a cutter so as to have concentric inner and outer edges. The two flat surfaces of this disk were subjected to coarse and fine polishing and then to cleaning to obtain a glass substrate of the corresponding Practical or Comparative Example. With each of the glass substrates thus produced, its various properties were evaluated.

"Workability" was evaluated by visually inspecting each glass substrate produced, evaluating it as "OK" if no scratch was found, "FAIR" if only minute scratches were found, and "NG" if cracking or chipping was found. The other properties were evaluated in the manners described earlier. The composition of the glass substrate of each example and the results obtained therewith are shown in Tables 1 to 3.

Tables 1 to 3 show the following. The glass substrates of Practical Examples 1 to 40 all had fracture toughnesses Kc higher than 0.90, and had $SiO_2$ elution A of 11 to 322, both in practically acceptable ranges. Moreover, they had A/Kc ratios in the range of from 8.7 to 301.2, which promises enhanced productivity while maintaining high quality. Moreover, they had alkali elution of 317 ppb or lower, i.e., lower than with conventional glass substrates. Furthermore, they had specific elastic moduli of 32.8 or higher, i.e., higher than with conventional glass substrates, and had adequate Vickers hardnesses in the range of from 559 to 591, i.e., adequate surface hardnesses. Moreover, they had linear thermal expansion coefficients in the range of from $64.7 \times 10^{-7}$ to $71.6 \times 10^{-7}/°C$., i.e., close to those of hard disk drive components.

On the other hand, Table 3 shows the following. The glass substrate of Comparative Example 1, of which the total content of $TiO_2+ZrO_2+Ln_xO_y$ was as high as 16.1%, had a low fracture toughness and high $SiO_2$ elution, resulting in an A/Kc ratio of 2727.3. This leads to low workability and thus low productivity. The glass substrate of Comparative Example 2, of which the $SiO_2$ content was as low as 43.6% and of which the total content of $TiO_2+ZrO_2+Ln_xO_y$ was as high as 19.7%, had a weak glass structure, and had a fracture toughness Kc, $SiO_2$ elution A, an A/Kc ratio, a linear thermal expansion constant all outside the desired ranges. The glass substrate of Comparative Example 3, of which the $SiO_2$ content was as high as 77.1%, had a low specific elastic modulus and low $SiO_2$ elution, resulting in an A/Kc ratio of 2.7, leading to low workability. Moreover, this glass substrate had high alkali elution B. The glass substrate of Comparative Example 4, of which the contents of $Al_2O_3$ and $R_2O$ (R=Li, Na, and K) were high, and the glass substrate of Comparative Example 5, of which the contents of $B_2O_3$ and the skeletal ingredients ($SiO_2+Al_2O_3+B_2O_3$) were high, both had a fracture toughness Kc, $SiO_2$ elution, an A/Kc ratio, and a linear thermal expansion coefficient all outside the desired ranges.

TABLE 1

| Glass Composition (% by Weight) | Practical Example | | | | | | |
|---|---|---|---|---|---|---|---|
| | 1 | 2 | 3 | 4 | 5 | 6 | 7 |
| $SiO_2$ | 67.6 | 66.0 | 66.8 | 66.8 | 66.8 | 66.8 | 66.8 |
| $Al_2O_3$ | 9.4 | 9.2 | 9.3 | 9.3 | 10.5 | 9.3 | 9.3 |
| $B_2O_3$ | 5.4 | 5.3 | 5.4 | 5.4 | 5.4 | 5.4 | 5.4 |
| $Li_2O$ | 5.0 | 4.9 | 5.4 | 5.0 | 5.0 | 4.5 | 4.5 |
| $Na_2O$ | 5.6 | 5.4 | 6.0 | 5.5 | 5.5 | 5.0 | 5.0 |
| $K_2O$ | 2.8 | 2.7 | 3.0 | 2.8 | 2.8 | 2.5 | 2.5 |
| MgO | | | | | | | |
| CaO | | | | | | | |
| SrO | | | | | | | |
| BaO | | | | | | | |
| ZnO | | | | | | | |
| $TiO_2$ | 1.9 | 1.9 | 1.9 | 3.4 | 1.9 | 3.8 | 3.1 |
| $ZrO_2$ | 1.9 | 1.9 | 1.9 | 1.9 | 1.9 | 1.0 | 2.3 |
| $La_2O_3$ | | | | | | | 0.8 |
| $Gd_2O_3$ | | | | | | | |
| $Y_2O_3$ | | | | | | 1.4 | |
| $Nb_2O_5$ | | 2.4 | | | | | |
| $Ta_2O_5$ | | | | | | | |
| $Sb_2O_3$ | 0.3 | 0.3 | 0.3 | | 0.3 | 0.3 | 0.3 |
| $SiO_2 + Al_2O_3 + B_2O_3$ | 82.4 | 80.4 | 81.4 | 81.4 | 82.6 | 81.4 | 81.4 |
| $R_2O: Li_2O + Na_2O + K_2O$ | 13.4 | 13.1 | 14.5 | 13.3 | 13.3 | 12.0 | 12.0 |
| $TiO_2 + ZrO_2 + Ln_xO_y$ | 3.8 | 6.2 | 3.8 | 5.3 | 3.8 | 6.3 | 6.2 |
| Fracture Toughness Kc | 1.02 | 1.22 | 1.06 | 0.98 | 1.08 | 0.96 | 1.26 |
| $SiO_2$ Elution A (ppb) | 46 | 61 | 45 | 59 | 52 | 138 | 11 |
| A/Kc | 45.1 | 50.0 | 42.3 | 60.0 | 48.1 | 143.8 | 8.7 |
| Workability | OK | OK | OK | OK | OK | OK | OK |
| Alkali Elution B (ppb) | 147 | 161 | 198 | 162 | 128 | 132 | 135 |
| Specific Elastic Modulus (E/ρ) | 33.5 | 33.3 | 33.5 | 33.9 | 33.5 | 34.2 | 33.4 |
| Vickers Hardness Hv | 577 | 591 | 587 | 589 | 581 | 589 | 586 |
| Expansion Coefficient α (×10$^{-7}$/° C.) | 67.4 | 66.1 | 71.9 | 66.6 | 68.0 | 65.9 | 64.7 |

| Glass Composition (% by Weight) | Practical Example | | | | | | | |
|---|---|---|---|---|---|---|---|---|
| | 8 | 9 | 10 | 11 | 12 | 13 | 14 | 15 |
| $SiO_2$ | 66.8 | 66.8 | 66.8 | 66.8 | 62.5 | 64.0 | 69.1 | 70.6 |
| $Al_2O_3$ | 9.3 | 9.3 | 9.3 | 9.3 | 15.4 | 13.9 | 11.1 | 9.6 |
| $B_2O_3$ | 5.4 | 5.4 | 5.4 | 5.4 | 5.0 | 5.0 | 2.7 | 2.7 |
| $Li_2O$ | 4.5 | 4.5 | 4.5 | 4.5 | 6.0 | 6.0 | 6.0 | 6.0 |
| $Na_2O$ | 5.0 | 5.0 | 5.4 | 5.0 | 5.0 | 5.0 | 5.0 | 5.0 |
| $K_2O$ | 2.5 | 2.8 | 2.5 | 2.5 | 2.5 | 2.5 | 2.5 | 2.5 |
| MgO | | | | | | | | |
| CaO | | | | | | | | |
| SrO | | | | | | | | |
| BaO | | | | | | | | |
| ZnO | | | | | | | | |
| $TiO_2$ | 1.0 | 0.4 | 0.4 | 1.0 | 1.9 | 1.9 | 1.9 | 1.9 |
| $ZrO_2$ | 1.0 | 0.4 | 0.4 | 1.0 | 0.6 | 0.6 | 0.6 | 0.6 |
| $La_2O_3$ | 1.3 | 0.5 | 0.5 | 1.3 | 0.7 | 0.7 | 0.7 | 0.7 |
| $Gd_2O_3$ | | | | | | | | |
| $Y_2O_3$ | | | | | | | | |
| $Nb_2O_5$ | 3.0 | 5.0 | 5.0 | 3.0 | | | | |
| $Ta_2O_5$ | | | | | | | | |
| $Sb_2O_3$ | 0.3 | | | 0.3 | 0.3 | 0.3 | 0.3 | 0.3 |
| $SiO_2 + Al_2O_3 + B_2O_3$ | 81.4 | 81.4 | 81.4 | 81.4 | 82.9 | 82.9 | 82.9 | 82.9 |
| $R_2O: Li_2O + Na_2O + K_2O$ | 12.0 | 12.3 | 12.4 | 12.0 | 13.5 | 13.5 | 13.5 | 13.5 |
| $TiO_2 + ZrO_2 + Ln_xO_y$ | 6.2 | 6.2 | 6.2 | 6.2 | 3.2 | 3.2 | 3.2 | 3.2 |
| Fracture Toughness Kc | 1.02 | 1.06 | 1.08 | 1.07 | 1.22 | 1.15 | 1.24 | 1.17 |
| $SiO_2$ Elution A (ppb) | 109 | 84 | 218 | 322 | 185 | 141 | 81 | 65 |

TABLE 1-continued

| | | | | | | | | |
|---|---|---|---|---|---|---|---|---|
| A/Kc | 106.4 | 79.0 | 201.5 | 301.2 | 151.6 | 122.9 | 65.5 | 55.5 |
| Workability | OK | OK | FAIR | FAIR | OK | OK | OK | OK |
| Alkali Elution B (ppb) | 128 | 127 | 163 | 173 | 177 | 158 | 222 | 235 |
| Specific Elastic Modulus (E/ρ) | 32.8 | 33.1 | 32.4 | 32.8 | 33.8 | 33.7 | 33.4 | 33.3 |
| Vickers Hardness Hv | 577 | 575 | 566 | 569 | 573 | 578 | 559 | 566 |
| Expansion Coefficient α (×10$^{-7}$/° C.) | 64.8 | 66.1 | 66.8 | 65.8 | 70.6 | 70.5 | 69.8 | 70.6 |

TABLE 2

| | Practical Example | | | | | | |
|---|---|---|---|---|---|---|---|
| Glass Composition (% by Weight) | 16 | 17 | 18 | 19 | 20 | 21 | 22 |
| SiO$_2$ | 62.5 | 62.5 | 69.1 | 69.1 | 69.8 | 68.8 | 69.8 |
| Al$_2$O$_3$ | 13.9 | 13.9 | 9.6 | 9.6 | 13.1 | 12.8 | 11.8 |
| B$_2$O$_3$ | 5.0 | 5.0 | 2.7 | 2.7 | 3.5 | 3.5 | 3.5 |
| Li$_2$O | 5.5 | 6.5 | 5.5 | 6.5 | 4.7 | 5.7 | 4.7 |
| Na$_2$O | 5.0 | 5.0 | 5.0 | 5.0 | 5.4 | 5.7 | 5.2 |
| K$_2$O | 2.5 | 2.5 | 2.5 | 2.5 | 3.4 | 3.1 | 2.6 |
| MgO | | | | | | | |
| CaO | | | | | | | |
| SrO | | | | | | | |
| BaO | | | | | | | |
| ZnO | | | | | | | |
| TiO$_2$ | 1.9 | 0.4 | 1.9 | 0.4 | | | 2.0 |
| ZrO$_2$ | 0.6 | 0.4 | 0.6 | 0.4 | | | |
| La$_2$O$_3$ | 0.7 | 0.5 | 0.7 | 0.5 | | | |
| Gd$_2$O$_3$ | | | | | | | |
| Y$_2$O$_3$ | | | | | | | |
| Nb$_2$O$_5$ | 2.0 | 3.0 | 2.0 | 3.0 | | | |
| Ta$_2$O$_5$ | | | | | | | |
| Sb$_2$O$_3$ | 0.3 | 0.3 | 0.3 | 0.3 | | 0.3 | 0.3 |
| SiO$_2$ + Al$_2$O$_3$ + B$_2$O$_3$ | 81.4 | 81.4 | 81.4 | 81.4 | 86.4 | 85.1 | 85.1 |
| R$_2$O:Li$_2$O + Na$_2$O + K$_2$O | 13.0 | 14.0 | 13.0 | 14.0 | 13.6 | 14.6 | 12.6 |
| TiO$_2$ + ZrO$_2$ + Ln$_x$O$_y$ | 5.2 | 4.2 | 5.2 | 4.2 | 0.0 | 0.0 | 2.0 |
| Fracture Toughness Kc | 1.13 | 1.05 | 1.22 | 1.11 | 1.37 | 1.43 | 1.39 |
| SiO$_2$ Elution A (ppb) | 156 | 176 | 107 | 68 | 75 | 82 | 65 |
| A/Kc | 137.7 | 168.3 | 87.8 | 61.2 | 54.9 | 57.3 | 46.9 |
| Workability | OK | OK | OK | OK | OK | OK | OK |
| Alkali Elution B (ppb) | 161 | 200 | 286 | 317 | 179 | 198 | 169 |
| Specific Elastic Modulus (E/ρ) | 33.4 | 33.6 | 33.1 | 33.2 | 33.7 | 33.8 | 33.2 |
| Vickers Hardness Hv | 571 | 572 | 557 | 555 | 578 | 587 | 568 |
| Expansion Coefficient α (×10$^{-7}$/° C.) | 68.5 | 72.5 | 69.5 | 72.8 | 67.3 | 69.4 | 66.3 |

| | Practical Example | | | | | | | |
|---|---|---|---|---|---|---|---|---|
| Glass Composition (% by Weight) | 23 | 24 | 25 | 26 | 27 | 28 | 29 | 30 |
| SiO$_2$ | 67.8 | 67.8 | 67.8 | 67.8 | 67.8 | 69.8 | 66.8 | 66.8 |
| Al$_2$O$_3$ | 11.8 | 11.8 | 11.8 | 11.8 | 11.8 | 13.9 | 11.3 | 11.3 |
| B$_2$O$_3$ | 3.5 | 3.5 | 3.5 | 3.5 | 3.5 | 1.4 | 3.4 | 3.4 |
| Li$_2$O | 4.7 | 4.7 | 4.7 | 4.7 | 4.7 | 4.7 | 4.5 | 4.5 |
| Na$_2$O | 5.2 | 5.2 | 5.2 | 5.2 | 5.2 | 5.2 | 5.0 | 5.0 |
| K$_2$O | 2.6 | 2.6 | 2.6 | 2.6 | 2.6 | 2.6 | 2.5 | 2.5 |
| MgO | 2.0 | | | | | | | |
| CaO | | 2.0 | | | | | | |
| SrO | | | 2.0 | | | | | |
| BaO | | | | 2.0 | | | | |
| ZnO | | | | | 2.0 | | | |
| TiO$_2$ | 2.0 | 2.0 | 2.0 | 2.0 | 2.0 | 2.0 | 3.8 | 3.8 |
| ZrO$_2$ | | | | | | | | 1.0 |
| La$_2$O$_3$ | | | | | | | 2.4 | 1.4 |
| Gd$_2$O$_3$ | | | | | | | | |
| Y$_2$O$_3$ | | | | | | | | |
| Nb$_2$O$_5$ | | | | | | | | |
| Ta$_2$O$_5$ | | | | | | | | |
| Sb$_2$O$_3$ | 0.3 | 0.3 | 0.3 | 0.3 | 0.3 | 0.3 | 0.3 | 0.3 |
| SiO$_2$ + Al$_2$O$_3$ + B$_2$O$_3$ | 83.1 | 83.1 | 83.1 | 83.1 | 83.1 | 85.1 | 81.4 | 81.4 |
| R$_2$O:Li$_2$O + Na$_2$O + K$_2$O | 12.6 | 12.6 | 12.6 | 12.6 | 12.6 | 12.6 | 12.0 | 12.0 |
| TiO$_2$ + ZrO$_2$ + Ln$_x$O$_y$ | 2.0 | 2.0 | 2.0 | 2.0 | 2.0 | 2.0 | 6.2 | 6.2 |
| Fracture Toughness Kc | 1.45 | 1.30 | 1.28 | 1.18 | 1.38 | 1.12 | 1.07 | 1.32 |
| SiO$_2$ Elution A (ppb) | 72 | 89 | 85 | 110 | 56 | 86 | 155 | 148 |
| A/Kc | 49.7 | 68.5 | 66.4 | 93.3 | 40.6 | 77.0 | 144.6 | 112.1 |
| Workability | OK | OK | OK | OK | OK | OK | OK | OK |
| Alkali Elution B (ppb) | 188 | 178 | 199 | 202 | 158 | 192 | 176 | 181 |
| Specific Elastic Modulus (E/ρ) | 33.8 | 33.9 | 32.9 | 32.9 | 33.3 | 32.8 | 33.0 | 33.0 |

TABLE 2-continued

| | | | | | | | | |
|---|---|---|---|---|---|---|---|---|
| Vickers Hardness Hv | 577 | 573 | 566 | 559 | 588 | 563 | 569 | 567 |
| Expansion Coefficient α (×10$^{-7}$/° C.) | 65.4 | 67.8 | 67.8 | 67.5 | 65.8 | 66.9 | 67.1 | 64.3 |

TABLE 3

| | Practical Example | | | | | | |
|---|---|---|---|---|---|---|---|
| Glass Composition (% by Weight) | 31 | 32 | 33 | 34 | 35 | 36 | 37 |
| SiO$_2$ | 66.8 | 66.8 | 66.8 | 66.8 | 66.8 | 66.8 | 66.8 |
| Al$_2$O$_3$ | 11.3 | 13.3 | 11.3 | 11.3 | 11.3 | 11.3 | 11.3 |
| B$_2$O$_3$ | 3.4 | 1.4 | 3.4 | 3.4 | 3.4 | 3.4 | 3.4 |
| Li$_2$O | 5.7 | 5.7 | 4.5 | 4.5 | 4.5 | 4.5 | 6.5 |
| Na$_2$O | 6.2 | 6.2 | 5.0 | 5.0 | 5.0 | 5.0 | 3.0 |
| K$_2$O | 3.1 | 3.1 | 2.5 | 2.5 | 2.5 | 2.5 | 2.5 |
| MgO | | | | | | | |
| CaO | | | 3.0 | 3.0 | 3.0 | 3.0 | 3.0 |
| SrO | | | | | | | |
| BaO | | | | | | | |
| ZnO | | | | | | | |
| TiO$_2$ | 1.9 | 1.9 | 1.9 | 1.9 | 1.9 | 1.9 | 1.9 |
| ZrO$_2$ | 0.6 | 0.6 | 0.6 | 0.6 | 0.6 | 0.6 | 0.6 |
| La$_2$O$_3$ | 0.7 | 0.7 | 0.7 | | | | 0.7 |
| Gd$_2$O$_3$ | | | | 0.7 | | | |
| Y$_2$O$_3$ | | | | | 0.7 | | |
| Nb$_2$O$_5$ | | | | | | | |
| Ta$_2$O$_5$ | | | | | | 0.7 | |
| Sb$_2$O$_3$ | 0.3 | 0.3 | 0.3 | 0.3 | 0.3 | 0.3 | 0.3 |
| SiO$_2$ + Al$_2$O$_3$ + B$_2$O$_3$ | 81.4 | 81.4 | 81.4 | 81.4 | 81.4 | 81.4 | 81.4 |
| R$_2$O:Li$_2$O + Na$_2$O + K$_2$O | 15.0 | 15.0 | 12.0 | 12.0 | 12.0 | 12.0 | 12.0 |
| TiO$_2$ + ZrO$_2$ + Ln$_x$O$_y$ | 3.2 | 3.2 | 3.2 | 3.2 | 3.2 | 3.2 | 3.2 |
| Fracture Toughness Kc | 1.03 | 1.20 | 1.08 | 1.11 | 1.05 | 1.03 | 1.05 |
| SiO$_2$ Elution A (ppb) | 122 | 88 | 99 | 85 | 102 | 80 | 120 |
| A/Kc | 119.0 | 73.2 | 91.7 | 76.6 | 97.1 | 77.7 | 114.3 |
| Workability | OK | OK | OK | OK | OK | OK | OK |
| Alkali Elution B (ppb) | 308 | 307 | 138 | 123 | 142 | 100 | 158 |
| Specific Elastic Modulus (E/ρ) | 33.1 | 32.9 | 33.2 | 33.4 | 33.5 | 33.0 | 34.5 |
| Vickers Hardness Hv | 560 | 562 | 588 | 592 | 574 | 599 | 589 |
| Expansion Coefficient α (×10$^{-7}$/° C.) | 74.2 | 74.6 | 68.8 | 68.0 | 69.3 | 68.1 | 70.1 |

| | Practical Example | | | Comparative Example | | | | |
|---|---|---|---|---|---|---|---|---|
| Glass Composition (% by Weight) | 38 | 39 | 40 | 1 | 2 | 3 | 4 | 5 |
| SiO$_2$ | 66.8 | 66.8 | 66.8 | 50.8 | 43.6 | 77.1 | 45.0 | 66.2 |
| Al$_2$O$_3$ | 11.3 | 11.3 | 13.3 | 10.6 | 14.5 | 8.0 | 22.0 | 14.8 |
| B$_2$O$_3$ | 3.4 | 3.4 | 1.4 | 6.6 | | 5.1 | | 10.5 |
| Li$_2$O | 2.5 | 6.5 | 4.5 | 4.2 | | 5.5 | 12.1 | 4.2 |
| Na$_2$O | 7.0 | 5.0 | 5.0 | 4.7 | | 1.2 | 6.5 | 1.6 |
| K$_2$O | 2.5 | 0.5 | 2.5 | 2.4 | | 3.1 | 3.2 | 2.7 |
| MgO | | | | 2.2 | 12.4 | | 4.2 | |
| CaO | 3.0 | 3.0 | 3.0 | 2.2 | 9.8 | | | |
| SrO | | | | | | | 2.1 | |
| BaO | | | | | | | 3.3 | |
| ZnO | | | | | | | | |
| TiO$_2$ | 1.9 | 1.9 | 1.9 | 3.3 | 6.6 | | 1.6 | |
| ZrO$_2$ | 0.6 | 0.6 | 0.6 | 6.2 | 10.3 | | | |
| La$_2$O$_3$ | 0.7 | 0.7 | 0.7 | 6.6 | | | | |
| Gd$_2$O$_3$ | | | | | | | | |
| Y$_2$O$_3$ | | | | | | | | |
| Nb$_2$O$_5$ | | | | | 2.8 | | | |
| Ta$_2$O$_5$ | | | | | | | | |
| Sb$_2$O$_3$ | 0.3 | 0.3 | 0.3 | 0.3 | | | | |
| SiO$_2$ + Al$_2$O$_3$ + B$_2$O$_3$ | 81.4 | 81.4 | 81.4 | 68.0 | 58.1 | 90.2 | 67.0 | 91.5 |
| R$_2$O:Li$_2$O + Na$_2$O + K$_2$O | 12.0 | 12.0 | 12.0 | 11.3 | 0.0 | 9.8 | 21.8 | 8.5 |
| TiO$_2$ + ZrO$_2$ + Ln$_x$O$_y$ | 3.2 | 3.2 | 3.2 | 16.1 | 19.7 | 0.0 | 1.6 | 0.0 |
| Fracture Toughness Kc | 1.11 | 1.06 | 1.09 | 0.77 | 0.87 | 1.11 | 0.85 | 0.79 |
| SiO$_2$ Elution A (ppb) | 90 | 121 | 156 | 2100 | 620 | 3 | 820 | 1080 |
| A/Kc | 81.1 | 114.2 | 143.1 | 2727.3 | 712.6 | 2.7 | 964.7 | 1367.1 |
| Workability | OK | OK | OK | NG | NG | NG | NG | NG |
| Alkali Elution B (ppb) | 112 | 158 | 156 | 400 | 0 | 620 | 880 | 510 |
| Specific Elastic Modulus (E/ρ) | 32.9 | 33.8 | 33.1 | 31.2 | 38.6 | 29.3 | 33.1 | 32.4 |
| Vickers Hardness Hv | 578 | 592 | 597 | 628 | 740 | 540 | 580 | 521 |
| Expansion Coefficient α (×10$^{-7}$/° C.) | 68.3 | 70.5 | 69.3 | 67.8 | 38.1 | 49.7 | 50.2 | 58.1 |

What is claimed is:

1. A glass composition comprising the following glass ingredients:
   62.5 to 75% by weight of $SiO_2$;
   1 to 16% by weight of $Al_2O_3$;
   an amount of $B_2O_3$ sufficient to improve the fusibility of the glass composition but not more than 8% by weight;
   $SiO_2 + Al_2O_3 + B_2O_3$ accounting for 80.4 to 90% by weight;
   a total of 0.3 to 15% by weight of $R_2O$ compounds, where R=Li, Na, and K, including 0.1 to 14.8% by weight of $Li_2O$, 0.1 to 14.8% by weight of $Na_2O$, and 0.1 to 10% by weight of $K_2O$; and
   a total of 0 to 15% by weight, zero inclusive, of $TiO_2 + ZrO_2 + Ln_xO_y$, where $Ln_xO_y$ represents at least one compound selected from the group consisting of lanthanoid metal oxides, $Y_2O_3$, $Nb_2O_5$, and $Ta_2O_5$.

2. A glass composition as claimed in claim 1, further comprising the following glass ingredients:
   a total of 12% or less by weight of one or two or more R'O compounds, where R' =Mg, Ca, Sr, Ba, and Zn.

3. A glass substrate formed of a glass composition comprising the following glass ingredients:
   62.5 to 75% by weight of $SiO_2$;
   1 to 16% by weight of $Al_2O_3$;
   at least 0.1% by weight of $Li_2O$;
   an amount of $B_2O_3$ sufficient to improve the fusibility of the glass substrate but not more than 8% by weight;
   $SiO_2 + Al_2O_3 + B_2O_3$ accounting for 80.4 to 90% by weight;
   $R_2O$ compounds in amounts sufficient to obtain a mixed akali effect, where R=Li, Na, and K, wherein each $R_2O$ compound present accounts for at least 0.1% by weight and total $R_2O$ is not more than 15% by weight; and
   a total of 0 to 15% by weight, zero inclusive, of $TiO_2 + ZrO_2 + Ln_xO_y$, where $Ln_xO_y$ represents at least one compound selected from the group consisting of lanthanoid metal oxides, $Y_2O_3$, $Nb_2O_5$, and $Ta_2O_5$.

4. A glass substrate as claimed in claim 3, further comprising the following glass ingredients:
   a total of 12% or less by weight of one or two or more R'O compounds, where R'=Mg, Ca, Sr, Ba, and Zn.

5. A glass substrate as claimed in claim 3, wherein the glass substrate is not subjected to strengthening.

6. A glass substrate as claimed in claim 3, wherein the glass substrate is a substrate for a magnetic disk.

7. A glass substrate as claimed in claim 3, wherein the glass substrate has a fracture toughness Kc of 0.90 MPa/m$^{1/2}$ or greater.

8. A glass substrate as claimed in claim 3, wherein the glass substrate has $SiO_2$ elution A in a range of from 10 to 450 ppb per 2.5-inch disk.

9. A glass substrate as claimed in claim 3, wherein the glass substrate has a fracture toughness Kc of 0.90 MPa/m$^{1/2}$ or greater, and has $SiO_2$ elution A in a range of from 10 to 450 ppb per 2.5-inch disk, with a ratio of the $SiO_2$ elution A to the fracture toughness Kc in a range of from 3 to 500.

10. A glass substrate as claimed in claim 3, wherein the glass substrate has alkali elution B of 350 ppb or lower per 2.5-inch disk.

11. A glass substrate as claimed in claim 3, wherein the glass substrate is not subjected to strengthening, and has a specific elastic modulus E/ρ of 30 or higher.

12. A glass substrate as claimed in claim 3, wherein the glass substrate is not subjected to strengthening, and has a Vickers hardness Hv in a range of from 500 to 700.

13. A glass substrate as claimed in claim 3, wherein the glass substrate is not subjected to strengthening, and has a linear thermal expansion coefficient α in a range of from 40 $10^{-7}$/° C. to 90×$10^{-7}$/° C.

14. A glass substrate as claimed in claim 3, wherein the glass substrate exhibits a weight reduction factor lower than 8.0% when kept in a melted state at 1,500 ° for 24 hours.

15. A glass substrate as claimed in claim 3, wherein the glass substrate has a glass transition temperature Tg of 600° C. or lower.

16. A glass substrate as claimed in claim 3, wherein the glass substrate has a liquid phase temperature $T_L$ of 1,300° C. or lower.

17. A glass substrate as claimed in claim 3, wherein a temperature $T_{log\eta=2}$ at which the glass substrate has a melt viscosity of log η=2 is 1,550° C. or lower.

18. A magnetic disk substrate comprising a glass substrate as claimed in claim 3 and a magnetic film formed on at least one surface thereof.

19. A magnetic disk substrate as claimed in claim 18, wherein the glass substrate further comprises the following glass ingredients:
   a total of 12% or less by weight of one or two or more R'O compounds, where R' =Mg, Ca, Sr, Ba, and Zn.

20. A magnetic disk substrate as claimed in claim 18, wherein the glass substrate is not subjected to strengthening.

21. A magnetic disk substrate as claimed in claim 18, wherein the glass substrate has a fracture toughness Kc of 0.90 MPa/m$^{1/2}$ or greater.

22. A magnetic disk substrate as claimed in claim 18, wherein the glass substrate has $SiO_2$ elution A in a range of from 10 to 450 ppb per 2.5-inch disk.

23. A magnetic disk substrate as claimed in claim 18, wherein the glass substrate has a fracture toughness Kc of 0.90 MPa/m$^{1/2}$ or greater, and has $SiO_2$ elution A in a range of from 10 to 450 ppb per 2.5-inch disk, with a ratio of the $SiO_2$ elution A to the fracture toughness Kc in a range of from 3 to 500.

24. A magnetic disk substrate as claimed in claim 18, wherein the glass substrate has alkali elution B of 350 ppb or lower per 2.5-inch disk.

25. A magnetic disk substrate as claimed in claim 18, wherein the glass substrate is not subjected to strengthening, and has a specific elastic modulus E/ρ of 30 or higher.

26. A magnetic disk substrate as claimed in claim 18, wherein the glass substrate is not subjected to strengthening, and has a Vickers hardness Hv in a range of from 500 to 700.

27. A magnetic disk substrate as claimed in claim 18, wherein the glass substrate is not subjected to strengthening, and has a linear thermal expansion coefficient α in a range of from 40×$10^{-7}$/° C. to 90 $10^{-7}$/° C.

28. A magnetic disk substrate as claimed in claim 18, wherein the glass substrate exhibits a weight reduction factor lower than 8.0% when kept in a melted state at 1,500° C. for 24 hours.

29. A magnetic disk substrate as claimed in claim 18, wherein the glass substrate has a glass transition temperature Tg of 600° C. or lower.

30. A magnetic disk substrate as claimed in claim 18, wherein the glass substrate has a liquid phase temperature $T_L$ of 1,300° C. or lower.

31. A magnetic disk substrate as claimed in claim 18, wherein a temperature $T_{log\eta=2}$ at which the glass substrate has a melt viscosity of log η=2 is 1,550° C. or lower.

* * * * *